May 17, 1949.  W. K. SONNEMANN  2,470,661

PHASE-SEQUENCE VOLTAGE NETWORK

Filed March 27, 1947

WITNESSES:
Edward Michaels
Nw. C. Groome

INVENTOR
William K Sonnemann.
BY O.B.Buchanan
ATTORNEY

Patented May 17, 1949

2,470,661

UNITED STATES PATENT OFFICE 2,470,661

PHASE-SEQUENCE VOLTAGE NETWORK

William K. Sonnemann, Roselle Park, N. J., assignor to Westinghouse Electric Corporation, East Pittsburgh, Pa., a corporation of Pennsylvania Application March 27, 1947, Serial No. 737,663

3 Claims. (Cl. 171—119)

My invention relates to a network for segregating either the positive or negative phase-sequence component of a system of delta voltages.

The general object of the invention is to provide such a network involving less equipment than has been necessary in previously known networks for the same purpose.

Typical sequence-segregating voltage-networks are shown in Figs. (c) to (f) on pages 248–249 of the Electrical Transmission and Distribution Reference Book, either the first, second or third edition, published by the Westinghouse Electric & Manufacturing Company in 1942, 1943 and 1944. These previously known networks have involved one or more potential-transformers, in addition to a substantially non-inductive resistor and an inductance-device. The potential-transformer or transformers have been special to the sequence-segregating filter, as distinguished from the potential-transformers which are utilized to serve other equipment, either because of the requirement of a special potential-tap connection, or a special phase-angle connection, which spoiled the phase-angle relationship of the potential-transformer voltages for other metering or relaying applications.

A more specific object of my invention is to provide a phase-sequence voltage-segregating network comprising a single-phase impedance-device which includes an element having mutual inductance, for producing a mutual-inductance voltage at the apex of an equilateral triangle built upon the voltage across the terminals of the impedance-device as a base, in the vector-diagram.

Figure 1:
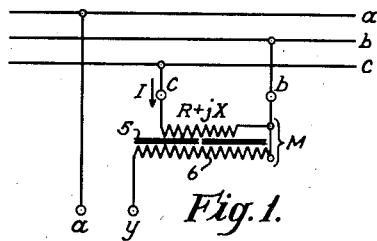
Figure 3:
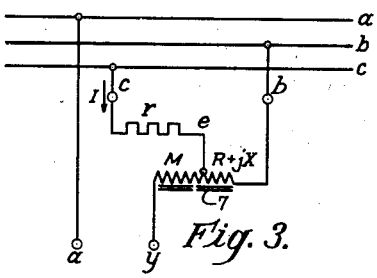
Figure 2:
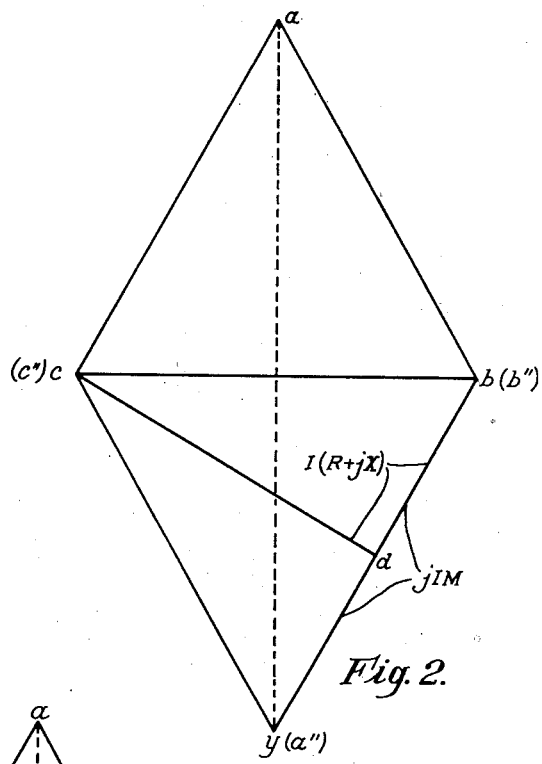
Figure 4:
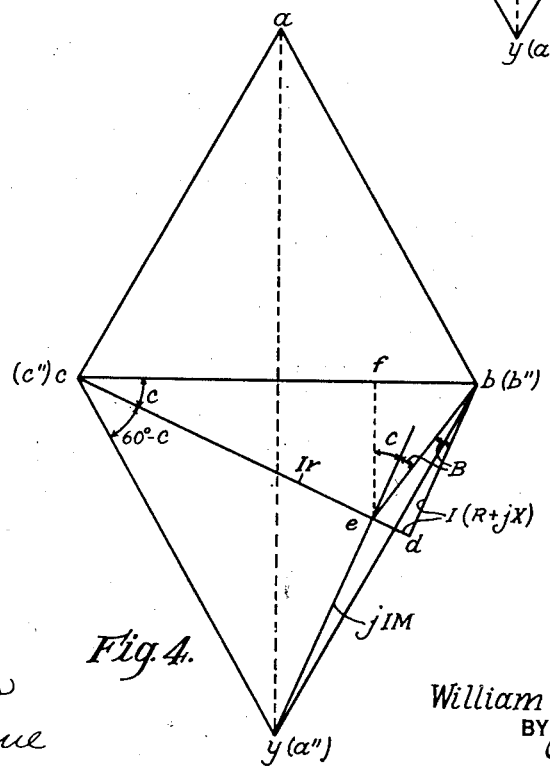

With the foregoing and other objects in view, my invention consists in the systems, combinations, structures, elements, connections, and methods of operation and design, hereinafter described and claimed, and illustrated in the accompanying drawing, wherein:

Figure 1 is a diagrammatic view of circuits and apparatus illustrating one form of embodiment of my invention, Fig. 2 is a vector-diagram for the apparatus shown in Fig. 1, Fig. 3 is a diagrammatic view showing another form of embodiment of my invention, and Fig. 4 is a vector-diagram for the apparatus shown in Fig. 3.

As shown in Fig. 1, my sequence-segregating voltage-network consists of a single, single-phase impedance device $(R+jX)$, which is shown as the primary circuit of a reactor-type transformer which operates as a two-winding reactor having a mutual reactance M, as indicated. The reactor is provided with an air-gap magnetizable core 5, which gives the reactor a substantial self-inductance X, with substantially linear characteristics.

In addition to the single-phase impedance-device, my filter-network, as shown in Fig. 1, comprises four terminals $a$, $b$, $c$ and $y$, and that is all. The terminals $a$, $b$ and $c$ are connected to a three-phase line $a$, $b$ and $c$ so as to make the delta line-voltage available in the network. The terminals $b$ and $c$ are connected to the respective terminals of the impedance-device $(R+jX)$. The secondary winding 6 of the mutual-inductance device, in the form of my invention shown in Fig. 1, is connected between the terminals $b$ and $y$. The terminals $a$ and $y$ are utilized as the output-terminals of the network.

The operation of the device of Fig. 1 is shown vectorially in Fig. 2, in which the delta-points of the three delta line-voltages are indicated at $a$, $b$ and $c$, or $a''$, $b''$ and $c''$, according to which phase-sequence is being considered. It will be observed that the line-voltages, if symmetrical, in either the positive-sequence or the negative-sequence, form an equilateral triangle. For convenience, two equilateral triangles are shown, both using the same base $bc$ or $b''c''$, which causes the delta-apex $a$ to fall above the line $bc$, for positive-sequence voltages, while the apex $a''$ falls below the same line, for negative-sequence voltages.

As in all positive or negative phase-sequence voltage-filters, the filter will respond to either the positive or the negative-sequence voltage-component, according to the way in which the connections are made, a reversal of the terminals $b$ and $c$ (or any two input-terminals) being all that is necessary to change from one phase-sequence response to the other. For convenience in explanation, my filter will be described as if it were a positive-sequence filter, for responding to the line-voltages when they contain no negative-sequence component, as indicated by the triangle $abc$, while having no response at all to the line-voltages when they have no positive-sequence component, as indicated by the triangle $a''$, $b''$, $c''$.

As shown in Fig. 2, the impedance-angle of the impedance $(R+jX)$, at the line-frequency, is 30°, as indicated by the angle $dcb$, which is to say that the resistance R is $$\sqrt{3}$$

times the self-inductance X of the impedance. As shown in Fig. 1, the primary circuit $(R+jX)$ of the impedance-device is traversed by a current I, which produces the voltage-drop $I(R+jX)$, which is shown at $cdb$ in Fig. 2, the line $cd$ representing the voltage-vector for the voltage-drop in the resistance-part R of the total impedance, while the line $db$ represents the voltage-vector for the voltage-drop in the inductive part X of the total impedance.

As shown in Fig. 2, the mutual inductance M of the device shown in Fig. 1 has a magnitude twice that of the self-inductance X, so that the vector $yb$, representing the voltage $jIM$ which is induced in the secondary winding 6 by the primary current I, is twice as long as the line $db$ representing the self-inductance voltage-drop $jIX$; and the two lines lie one over the other, at least in the theoretical or ideal state. As shown in Fig. 2, the point $y$, representing the terminal of the mutual-inductance voltage, is coincident with the point $a''$, representing the third terminal of a system of negative-sequence deltavoltages built upon the line $bc$ as a base.

It will be apparent, from Fig. 2, that when the impressed three-phase line-voltages are symmetrical positive-sequence voltages, the potentials of the network-terminals $a$ and $y$, in Fig. 1, are shown at $a$ and $y$ in Fig. 2, one being above the line $bc$, and the other below it, so that the network produces a substantial output-voltage $ay$ in response to the positive-sequence line-voltages, as indicated in Fig. 2. However, when the impressed line-voltages are symmetrical negative-sequence voltages (having no positive-sequence component), the potential of the third delta-point $a''$ of the line-voltages is coincident with the potential $y$ of the mutual-inductance voltage of the network, so that the output-voltage $a''y$ of the network is zero, showing that there is no response to any negative-sequence component of the delta line-voltages.

In Fig. 2 we are given: $ab=bc=ca=by=yc=1$ (in any desired unit of voltage-measurement). We are also given the angle $dcb$, which bisects the angle $ycb$. It at once follows that $$\frac{by}{bd}=\frac{IM}{IX}=\frac{M}{X}=2$$

In Fig. 2, the line $cd$ represents the voltage-drop IR in all of the resistance which is included in the impedance $(R+jX)$. If a resistance less impedance-coil were possible, this resistance R could be all located outside of the impedance-coil, representing a non-inductive resistor. Necessarily, however, inductance-coils have some resistance, and in accordance with our invention, the inductance-coil may either be constructed with a large amount of resistance, so that its resistance will make up the whole of the resistance R which is needed in the 30° impedance $(R+jX)$, or, if desired, a conventional choke-coil or impedance-coil could be utilized, supplying all of the inductance $jX$ of the impedance $(R+jX)$, and only a small amount of the resistance R, the rest of the resistance being made up by a serially connected resistance in the ordinary manner, such as is shown at $r$ in Fig. 3 which is about to be described.

In the form of embodiment of my invention shown in Fig. 3, I use a tapped reactor 7 which is connected between the terminals $b$ and $y$. The tapped point $e$ of the reactor is connected, through a non-inductive resistor, $r$, to the terminal $c$. The primary part, $eb$, of the reactor 7 has an impedance $(R+jX)$, with different values of R and X than in Fig. 1. The mutual reactance between the portions $eb$ and $ye$ of the reactor 7 is again indicated by the letter M in Fig. 3, although this mutual reactance has a value different from that which was utilized in the Fig. 1 embodiment of my invention.

The operation of the filter shown in Fig. 3 is shown vectorially in Fig. 4. In this case, the primary resistance-drop, $ed=IR$, in the reactor, is serially included, so as to be vectorially added to the primary reactance-drop, $db=jIX$, and the induced mutual-reactance voltage, $ye=jIM$, to make up the voltage $yb$. In this case, therefore, it is impossible to make the reactor-resistance R large enough to compose all of the resistance of the impedance-device $(r+R+jX)$ which is connected between the input-terminals $c$ and $b$, because $ye$ and $db$ are parallel with each other and at right angles to $cd$, and the point $y$ must be so located as to form the apex of an equilateral triangle built on the base $bc$. It is necessary, therefore, that the reactor-resistance R shall be only a small part of the total impedance-resistance $(r+R)$, and it is necessary that the impedance-angle, $dcb=C$, shall be less than 30°. This produces a reactor power-factor or impedance-angle, $deb=(90°-B)$, which is fairly close to 90°, values of 80 or 82° being common values for ordinarily designed reactors, although I am not limited to any particular value, so long as the impedance-angle $(90°-B)$ of the reactor 7 in Fig. 3 is considerably larger than the impedance-angle, $dcb=C$, of the entire primary-circuit impedance $(r+R+jX)$.

In analyzing Fig. 4, it will be convenient to drop a perpendicular $ef$ onto the line $cb$. In Fig. 4, therefore, we are given: $ab=bc=ca=by=yc=1$ (in any desired unit of voltage-measurement). We are also given the fact that $bd$, which represents the impedance-voltage IX, is at right angles to $dc=I(R+r)$, and the fact that $ey$, which represents the mutual-coupling voltage IM, is in phase with, and hence parallel to, $bd=IX$.

In rt. $\triangle$ $yec$,
$$ey=IM=\sin(60°-C)$$
$$ce=\cos(60°-C)$$

In rt. $\triangle$ $cfe$,
$$ef=\cos(60°-C)\sin C$$

In rt. $\triangle$ $efb$,
$$eb=\frac{\cos(60°-C)\sin C}{\cos(B+C)}$$

In rt. $\triangle$ $cdb$,
$$bd=IX=\sin C$$

In rt. $\triangle$ $edb$,
$$be=\frac{\sin C}{\cos B}$$

$$\therefore eb=\frac{\cos(60°-C)\sin C}{\cos(B+C)}=\frac{\sin C}{\cos B}$$

$$\therefore \cos B \cos(60°-C)=\cos(B+C)$$

$$\therefore \cot C=2\tan B+\sqrt{3}$$

which may conveniently be solved by plotting.

Also,
$$\frac{IM}{bd}=\frac{IM}{IX}=\frac{M}{X}=\frac{\sin(60°-C)}{\sin C}=\frac{1}{2}\sqrt{3}\cot C-\frac{1}{2}$$

The response of the filter-network shown in Figs. 3 and 4 is obviously the same as that which is obtained with the network of Figs. 1 and 2. In each case, a large positive-sequence voltage-response $ay$ is obtained, and a zero negative-sequence response $a''y$.

While I have illustrated my invention, and explained its principles of operation, in connection with only two different forms of embodiment, both adjusted to substantially eliminate any response to the positive or negative phase-sequence component, as the case may be, I wish it to be understood that the broader principles of the invention are susceptible of embodiment in other equivalent forms, and with other adjustments so that the output-voltage $y$ is not coincident with the equilateral-triangle apex $a''$, thus selectively producing a small response to one phase-sequence, and a large response to the other phase-sequence. I desire, therefore, that the appended claims shall be accorded the broadest construction consistent with their language.

I claim as my invention:

1. A network for segregating a phase-sequence component of a system of delta voltages, comprising a single-phase impedance-device including an element having mutual inductance, the impedance-angle of the impedance-device at the system-frequency, and the magnitude of the mutual inductance, being conjointly such that the mutual inductance will produce a voltage substantially at the apex of an equilateral triangle built upon the voltage across the terminals of the impedance-device as a base, in the vector-diagram, said network having four terminals, two terminals being adapted to connect the respective terminals of the impedance-device to two of the delta-points of the delta input-voltages, one terminal being for the other delta-point of the delta input-voltages, and the remaining terminal being for the mutual-inductance voltage, the latter two terminals being the output-terminals of the network, characterized by said impedance-device including a resistor and a mutual-inductance element, said mutual-inductance element being a tapped reactor having said resistor connected to the tapped point.

2. A network for segregating a phase-sequence component of a system of delta voltages, comprising a single-phase impedance-device including an element having mutual inductance, the impedance-angle of the impedance-device at the system-frequency, and the magnitude of the mutual inductance, being conjointly such that the mutual inductance will produce a voltage substantially at the apex of an equilateral triangle built upon the voltage across the terminals of the impedance-device as a base, in the vector-diagram, said network having four terminals, two terminals being adapted to connect the respective terminals of the impedance-device to two of the delta-points of the delta input-voltages, one terminal being for the other delta-point of the delta input-voltages, and the remaining terminal being for the mutual-inductance voltage, the latter two terminals being the output-terminals of the network, characterized by said impedance-device including a substantially non-inductive resistor and a mutual-inductance element, said mutual-inductance element being a tapped reactor having said resistor connected to the tapped point, the impedance-angle C of the impedance-device being related to the impedance-angle $(90°-B)$ of the mutual-inductance element substantially according to the formula $$\cot C = 2 \tan B + \sqrt{3}$$

and the mutual inductance M of the mutual-inductance element being related to the self-inductance X of said impedance-device substantially according to the formula $$\frac{M}{X} = \frac{1}{2}\sqrt{3} \cot C - \frac{1}{2}$$

3. A phase-sequence-selective network for a system of delta voltages, comprising a single-phase impedance-device including resistance and mutual inductance, said mutual inductance being connected to said impedance-device to produce an output-voltage of the network, said network having four terminals, two terminals being adapted to connect the respective terminals of the impedance-device to two of the delta-points of the delta input-voltages, one terminal being for the other delta-point of the delta input-voltages, and the remaining terminal being for the mutual-inductance voltage, the latter two terminals being the output-terminals of the network, characterized by said impedance-device including a resistor and a mutual-inductance element, said mutual-inductance element being a tapped reactor having said resistor connected to the tapped point.

WILLIAM K. SONNEMANN.

REFERENCES CITED

The following references are of record in the file of this patent:

FOREIGN PATENTS

| Number | Country | Date |
|---|---|---|
| 591,357 | Germany | Jan. 20, 1934 |